Patented Apr. 29, 1930

1,756,393

UNITED STATES PATENT OFFICE

FOSTER DEE SNELL, OF BROOKLYN, NEW YORK

COMPOSITION BLACKBOARD AND METHOD OF MAKING SAME

No Drawing.  Application filed December 23, 1927. Serial No. 242,293.

This invention relates to composition blackboards and methods of making same; and it comprises as a new article a hard opaque slab or sheet composed of a body of fine grained or opaque dark colored mineral matter such as chromite, magnetite, rutile, menaccanite, etc., with a vitreous binder of the nature of ordinary glass, such binder being advantageously also dark colored or opaque and said slab or sheet having sufficient superficial roughness or "tooth" to make writing thereon convenient; and it also comprises a method of making such an article wherein a glass composition is charged with as much fine, dark opaque chemically inert mineral matter as it will take up without forfeiting fluidity in a molten state, the fused mass is converted into a slab or sheet and an outer surface of the slab or sheet is removed to give a superficial matt appearance; all as more fully hereinafter set forth and as claimed.

Blackboards may be, and sometimes are, merely painted wood, or wood covered with a surfacing composition. These however are unsatisfactory in use and for schools and the like, slate slabs or sheets are frequently used. It is a matter of some difficulty to obtain unitary slabs of any size desired and to provide sheets of uniform thickness while the damage in transportation and handling is considerable. Nor is a slate surface usually wholly uniform or of the exact character desired for use with chalk so these slate sheets are frequently further treated, being rubbed, sanded, coated or painted. These coatings are not long lived. Chalks and crayons usually contain more or less hard granular matter, such as sand, and have considerable abrading effect, wearing through these coatings in time.

Various substitutes for slate have been proposed but have not met with any great commercial success. Black plate glass is one of these which has been used to a limited extent; the glass being given a surface adapted to take chalk by sand blasting. Unfortunately, the roughness of the surface soon wears down, leaving local smooth glass areas which will not take chalk.

In the present invention I have provided a composition for blackboards which may be converted into slabs or sheets of suitable shape and size by the ordinary glass making and working methods, and which is, so to speak, rough all through so that the surface cannot wear smooth; nor can local smooth areas form. The composition may be regarded either as a glass body containing a large amount of disseminated uniformly distributed granules of moderate size and moderate hardness; or as a body of such granules bonded by a fused glass matrix. In my invention I incorporate into an ordinary soda-lime glass composition as much of a fine grained, opaque, dark colored mineral matter as the glass will take up without unduly forfeiting fluidity at glass working temperatures and under glass working conditions. It is my object to produce a composition which can be made and handled in an ordinary glass factory. The mineral matter used should be rather harder than the glass so that in the blackboard preferential wear takes place in the binder between grains. It should be tolerably fine, but not of colloidal fineness since its function is to offer a rough surface to the chalk or crayon. A fineness such that the mineral matter will all pass through a 100 mesh sieve is about right for the present purpose. Since I am using the glass not only as a binder but as a convenience in working into slabs or sheets, I do not wish to disturb its ordinary properties and therefore I use mineral matters which are chemically inert with regard to the particular glass composition used. The best of these minerals I have found is chromite, or chrome iron ore, which has the right amount of hardness, is opaque and dark colored, has substantially no chemical action on ordinary glass compositions although readily "wet" and bonded thereby; and is readily distributed through molten glass without segregation. It can either be admixed with molten glass or be admixed with powdered glass in the cold and the mixture subsequently heated to melt the glass. Its hardness (5.5 on Mohs' scale) is about right in giving the desired hardness differential with glass which generally has a hardness around 2.5. Magnetite may be used. It has a suitable hardness and its opacity and blackness are good. But it is somewhat more soluble in glass to which it gives up FeO, thereby changing the glass composition and properties somewhat. The extent of this attack is however not sufficient to preclude its convenient use and to the extent that iron dissolves, the glass is darkened which is desirable. Rutile or native $TiO_2$ has a proper hardness and inertness but is not as opaque or dark as the two minerals just mentioned. Reducing conditions aid attack but also produce a dark purple color in the bonding glass. Menaccanite, ilmenite and various other dark colored minerals may also be used. I do not find emery or other forms of alumina suitable for my purposes even when these minerals are black and opaque since the granule hardness is rather too great for blackboard purposes and further, the alumina acts chemically on glass with production of alumino-silicates and interference with its ordinary properties.

The glass employed as a bond may be any ordinary glass composition used for making sheet and plate glass. Ordinary soda-lime glass works very well. While white glass compositions may be employed I find in practice that it is well to color the glass as it gives a better blackboard. Copper oxides, manganese oxides, cobalt oxides and various other coloring agents are suitable. In practice, I ordinarily employ $MnO_2$ in quantities sufficient to give a dark or opaque amethystine color. A good glass for the present purpose may be made with the aid of 100 parts silica, 35 parts soda ash, 12 parts lime, 10 parts Chile saltpeter and 10 parts pyrolusite; this giving about 140–145 parts of molten glass. This composition in a molten state will take up about half its weight of added 100 mesh chromite without undue loss of liquidity and malleability at glass working temperatures.

The opaque mineral used may be ground together with the proper amount of glass or with such a composition as just stated and the whole fused. This is more convenient in glass house practice than working the mineral matter into the molten glass. About 60 parts of chromite passing 100 mesh standard sieve give the desired results with a batch of glass made of the indicated substances in the indicated proportions. In grinding chromite so that it will all just pass through 100 mesh sieve much of the material is much finer; but with this grinding the right proportions of grain sizes are obtained. Coarser material gives a blackboard which is too rough while with chromite reduced to an impalpable powder and worked into glass the product is too much of the nature of a colloidal dispersion; with it I do not get the kind of surface I want.

Fused glass containing dispersed opacifying material made under the present invention is formed into a sheet or slab in any of the ordinary ways, such as the rolling operation ordinarily employed in making plate glass. With chromite present in the proportions specified and of the character specified, rolling and other operations are practically as ready as with ordinary plate glass. The sheet or slab on cooling is smooth surfaced and glossy and to put it in a condition for use, the outer surface must be removed to expose the distributed mineral matter. This may be done by sand blasting or by pickling with hydrofluoric acid. Once formed, the rough and dull surface persists indefinitely long, taking chalk or crayon marks readily and not wearing to give smooth spots or areas. The granular matter being a little harder than the glass, the initial type of surface persists however long the board may be in use.

What I claim is:

1. A composition of matter adapted for use as a blackboard and comprising a vitreous matrix having uniformly distributed therethrough an opaque, inert and finely divided, somewhat harder granular mineral.

2. A composition of matter adapted for use as a blackboard and comprising a matrix of glass having uniformly distributed therethrough an opaque, inert somewhat harder granular mineral, said mineral being composed of grains of various sizes, the mixture passing through a standard 100 mesh sieve.

3. A blackboard comprising a matrix of colored glass having uniformly distributed therethrough inert and finely divided opaque, dark colored mineral material, in quantity sufficient to impart a grainy texture to the mixture.

4. A composition of matter adapted for use in permanent blackboards and the like, said composition comprising a vitreous matrix, and finely divided chromite uniformly distributed therethrough in quantity sufficient to give a grainy texture, said chromite being composed of grains passing a 100 mesh standard sieve.

5. In the manufacture of compositions adapted for use as blackboards and for similar purposes the process which comprises distributing moderately fine, moderately hard grains of opaque dark colored mineral matter throughout a body of glass material, melting the mixture to glass, forming such glass into a sheet and removing the outer surface.

6. In the manufacture of compositions adapted for use as blackboards and for similar purposes the process which comprises distributing moderately fine grains of chromite throughout a body of glass material, melting the mixture, forming the mixture into a solid sheet and removing the outer surface.

7. A composition of matter adapted for use as a blackboard and comprising a vitreous matrix having uniformly distributed therethrough an inert and finely divided somewhat granular mineral, the said vitreous matrix and granular mineral being of different degrees of hardness.

8. A blackboard comprising a vitreous matrix having uniformly distributed therethrough an inert and finely divided, somewhat granular mineral, the said vitreous matrix and granular mineral being of different degrees of hardness, so as to render the surface of the blackboard of a grainy texture.

9. In a blackboard composition a body of black glass containing finely divided dispersed black mineral matter of somewhat greater hardness, said mineral matter being about 100 mesh fineness and said body having a sandblasted surface developing the graininess due to such dispersed mineral matter.

In testimony whereof, I have hereunto affixed my signature.

FOSTER DEE SNELL.